Feb. 9, 1960 — W. R. CUTLER — 2,924,425
AEROFOIL-SECTION BLADED STRUCTURES
Filed Jan. 29, 1954
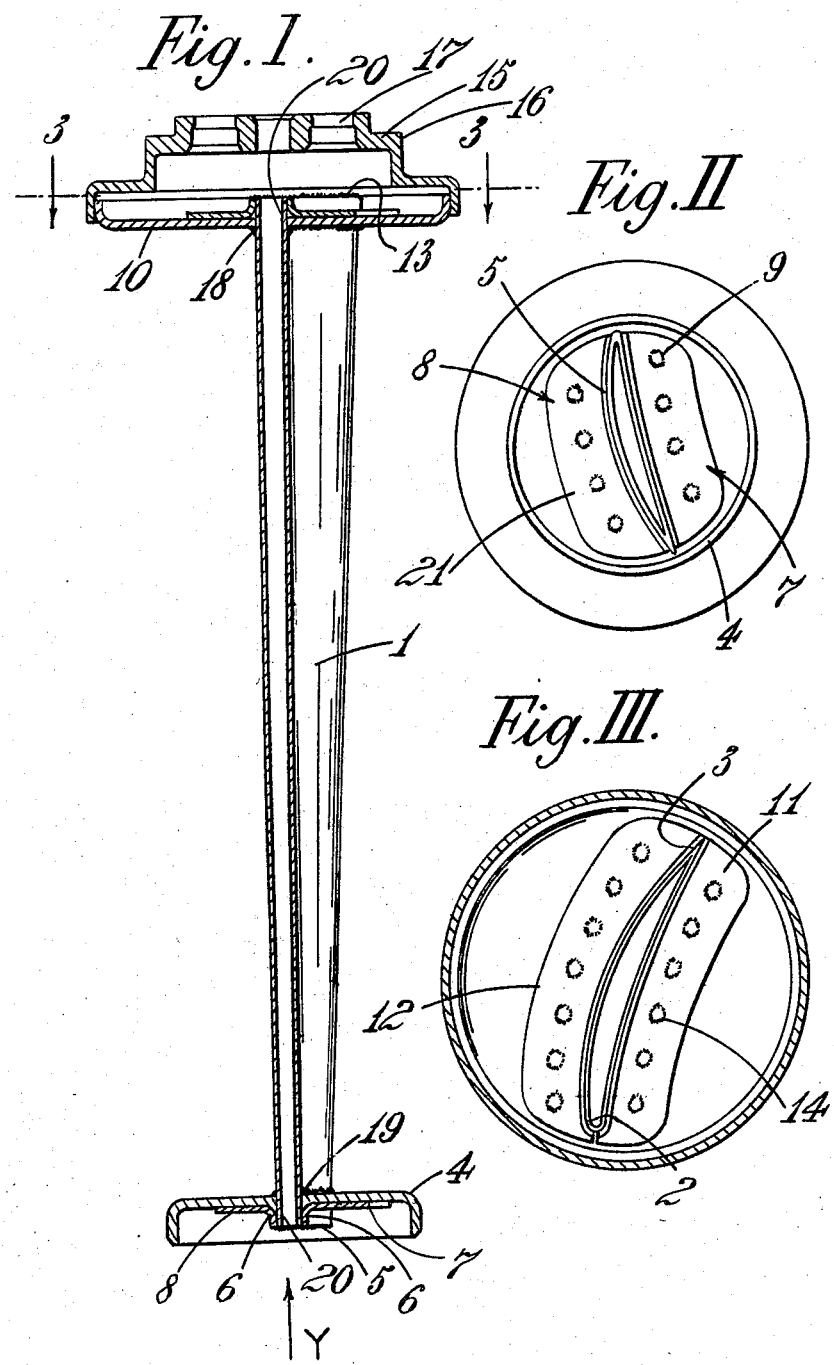

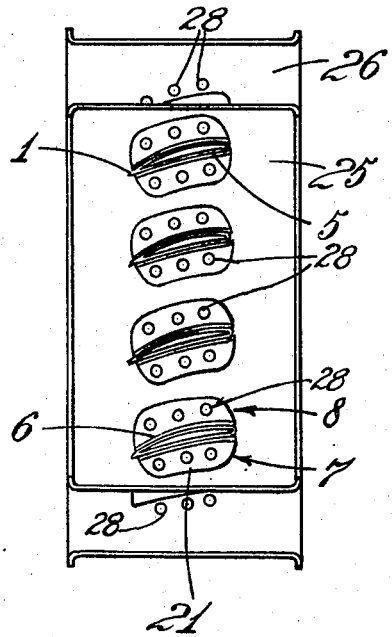
Fig. V.
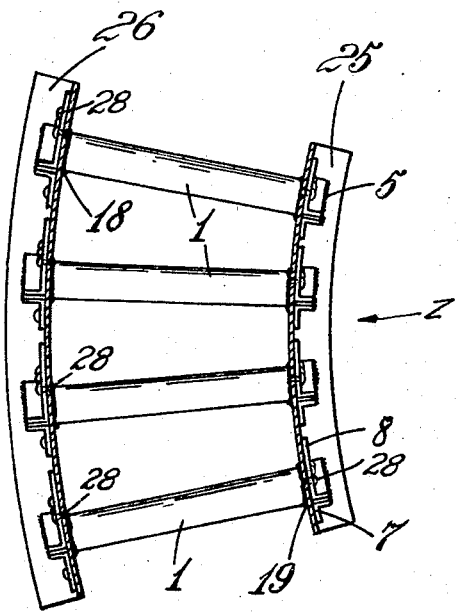
Fig. IV.

United States Patent Office 2,924,425
Patented Feb. 9, 1960

2,924,425

AEROFOIL-SECTION BLADED STRUCTURES

William Richard Cutler, Bristol, England, assignor, by mesne assignments, to Bristol Aero-Engines, Limited, Bristol, England, a British company Application January 29, 1954, Serial No. 407,053

Claims priority, application Great Britain February 2, 1953

6 Claims. (Cl. 253—78)

The present invention comprises improvements in or relating to assemblies comprising a carrier member and one or more aerofoil sectioned blades connected to the carrier member.

Aerofoil-section blades as used in air compressors and turbines and other fluid flow power conversion machines are frequently of hollow sheet-metal construction, this form being advantageous in the interest of lightness and economical manufacture and providing the possibility of passing a cooling or heating flow of fluid through the blades. Difficulties are, however, experienced in connecting such blades to their carrier members and various designs for attached roots have been proposed. The simplest and most obvious arrangement is to have the end of the hollow blade passing through a correspondingly shaped perforation in a carrier member, the joint between the blade and the carrier member being brazed or fillet welded. The operation of brazing or fillet welding the joint has, however, been found to introduce so much distortion in to the assemblies as to be impracticable, and an object of the present invention is to provide an almost equally simple assembly which is not or not so subject to such distortion during manufacture.

To this end an assembly according to the present invention comprises a carrier member, a hollow sheet-metal aerofoil-sectioned blade having an end portion of aerofoil cross-section projecting through a perforation in said carrier member, an angle section attachment member one flange of which is riveted or spot welded to the carrier member, and the edge of the other flange of which is edge welded to the end of said projecting portion of the blade.

During manufacture of an assembly as just defined the steps of inserting an end portion of the blade through the perforation in the carrier member, riveting or spot welding the attachment member to the carrier member and edge welding the blade to the attachment member may be carried out in any convenient order which is possible having regard to the shape and configuration of the parts to be assembled.

It is preferred that said attachment member substantially surrounds said projecting portion of the blade, and while in some arrangements, as for example, in the case of a blade having a comparatively blunt leading edge, it may be possible to provide a one-piece attachment member, the attachment member may, according to a feature of the invention, be formed in two angle section parts each extending along one side of the projecting portion of the blade substantially from its leading to its trailing edge.

The construction according to the invention is applicable either to assemblies having a single blade which is adjustable for incidence relative to its carrier member, or to assemblies having a set of blades connected to a carrier member which may either be a segment of a ring or a complete ring.

Hollow sheet metal aerofoil-sectioned blade-carrier member assemblies in accordance with the present invention will now be described with reference to the accompanying drawings whereof:

Figure I is a longitudinal section through an assembly intended for use as an adjustable guide blade at the air entry of the compressor of a gas turbine engine, Figure II is an end view in the direction of arrow Y in Figure I, Figure III is a section along the line III—III of Figure I, Figure IV is a longitudinal section through an assembly of a set of blades attached to segmental carrier members, and Figure V is a view in the direction of arrow Z in Figure IV.

Referring firstly to Figures I to III of the drawings the assembly comprises a hollow tapered blade 1 formed from sheet-metal by folding along the leading edge 2 and welding along the trailing edge 3, and a shallow circular cup-shaped carrier member 4. The carrier member 4 is formed with a perforation similar in profile to the profile of the blade, and the perforation receives the narrower end of the blade with an end portion 20 of the blade projecting through the carrier member. In order to make up the assembly the flange 21 of an angle section attachment member, which is formed in two parts 7 and 8, is spot welded as at 9 to the carrier member 4. The narrower end of the blade 1 is then inserted through the perforation in the carrier member and the projecting portion 20 of the blade is welded around its edge 5 to the edge of the flange 6 of the attachment member. As will be seen from the drawings the attachment member is arranged so that the flange 6 lies against the portion 20 with the flange 21 extending outwardly therefrom, the flange 6 of the parts 7 and 8 being shaped to fit the front and back faces of the blade substantially from the leading edge to the trailing edge of the blade.

The weld around the edge 5 is preferably made by the electric arc method, using an inert gas such as argon to prevent oxidation in the welding zone.

The heating of the carrier member 4 involved in the spot-welding process is very localised and insufficient to cause appreciable distortion of the assembly, while the heat from the edge-welding process does not pass directly into the carrier and the heating effect is, therefore, comparatively small. Rivets may be used in place of the spot welds 9 if desired.

The manner of attaching the carrier member at the larger end of the blade 1 is the same as that already described. The carrier comprises a cup-shaped member 10, and an angle-section attachment member, formed in two parts, 11 and 12, is edge-welded to the blade, as at 13, and spot-welded to the carrier member 10 as at 14. The carrier member 10 is closed by a further cup-shaped mounting member 15 having a machined seating 16 which engages a corresponding seating in the compressor structure so that the assembly can be rotated to adjust the incidence of the blade. The member 15 is also provided with openings 17 for the admission of hot air for passage through the blade to prevent accumulations of ice.

Since the manner in which the blade 1 is attached to the carrier members 4 and 10 does not guarantee air-tightness, this is achieved by applying around the junction of the working portion of the blade and the carrier members a fillet 18, 19 of synthetic resin capable of setting and withstanding the working temperature of the blade. For the assembly described, namely when the blade is an air compressor blade, a cold-setting epoxy resin has been found satisfactory for this purpose.

In the case where it is desired to attach a set of blades to a carrier member to form a segment or ring of blades, the cup-shaped carrier members 4 and 10 are replaced by appropriately shaped segmental or ring-shaped carrier members.

A blade assembly intended for use in an axial flow compressor of a gas turbine engine and comprising a set of hollow sheet-metal aerofoil-section blades 1 and a pair of segmental carrier members 25, 26 is shown in Figures IV and V. Each end of each blade is attached to one of the carrier members in the same manner as has already been described with reference to Figures I, II and III of the drawings, except that the flanges 21 of the angle section attachment members constituted each by parts 7 and 8 are riveted to the carrier members 25, 26 as at 28 instead of being spot welded thereto. Parts in Figures IV and V corresponding to parts in Figures I, II and III are indicated by like reference numerals. Also as previously described, the junction of the working portion of each blade and the carrier members 25, 26 is sealed with a fillet of cold setting epoxy resin.

I claim:

1. An assembly comprising a carrier member, a hollow sheet metal aerofoil-sectioned blade having an end portion of aerofoil section projecting through a perforation in said carrier member, and an angle-section attachment member one flange of which is riveted to the carrier member, and the edge of the other flange of which is edge welded to the end of said projecting portion of the blade.

2. An assembly as claimed in claim 1, wherein said attachment member substantially surrounds said projecting portion of the blade.

3. An assembly as claimed in claim 2, wherein said attachment member is formed in two angle section parts each extending along one side of the projecting portion of the blade substantially from its leading to its trailing edge.

4. An assembly comprising a carrier member, a hollow sheet metal aerofoil-sectioned blade having an end portion of aerofoil section projecting through a perforation in said carrier member, and an angle-section attachment member one flange of which is spot welded to the carrier member, and the edge of the other flange of which is edge welded to the end of said projecting portion of the blade.

5. An assembly as claimed in claim 4, wherein said attachment member substantially surrounds said projecting portion of the blade.

6. An assembly as claimed in claim 5, wherein said attachment member is formed in two angle section parts each extending along one side of the projecting portion of the blade substantially from its leading to its trailing edge.

References Cited in the file of this patent

UNITED STATES PATENTS

| | | |
|---|---|---|
| 1,996,155 | Janette | Apr. 2, 1935 |
| 2,575,558 | Newey et al. | Nov. 20, 1951 |
| 2,681,788 | Wosika | June 22, 1954 |
| 2,682,515 | Naps | June 29, 1954 |

FOREIGN PATENTS

| | | |
|---|---|---|
| 225,221 | Switzerland | Apr. 16, 1943 |
| 823,442 | France | Oct. 18, 1937 |
| 891,422 | France | Feb. 22, 1943 |